United States Patent

Scholle

[19]

[11] 3,839,773
[45] Oct. 8, 1974

[54] METHOD OF CONNECTING WIRE CABLES IN LOCKING BOLTS FOR A TRACK-LAYING CHAIN

[75] Inventor: Karl Scholle, Remscheid, Germany
[73] Assignee: Diehl, Nurnberg, Germany
[22] Filed: June 25, 1973
[21] Appl. No.: 373,438

[30] Foreign Application Priority Data
June 26, 1972  Germany.......................... 2231291

[52] U.S. Cl................................. 29/148.3, 308/37
[51] Int. Cl...................... B21k 19/00, B62d 55/08
[58] Field of Search............... 29/148.3, 400 D, 526; 305/37

[56] References Cited
UNITED STATES PATENTS
3,091,837    6/1963    McCormick...................... 29/148.3

Primary Examiner—Thomas H. Eager
Attorney, Agent, or Firm—Walter Becker

[57] ABSTRACT

A method for connecting wire cables to locking bolts for a track-laying chain in which the cables are inserted into diametral bores formed in the locking bolts. The locking bolts are then confined radially and force is exerted on the ends of the bolts to deform the bolts into gripping engagement with the cables. In connecting several bolts to the cables an end bolt is fixedly connected to the cables and the others of the bolts are successively connected to the cables while spacing the bolts a predetermined distance from each other. The invention also includes an apparatus for engaging the bolts during the deforming thereof and for locating the bolts in spaced relation to each other.

4 Claims, 5 Drawing Figures

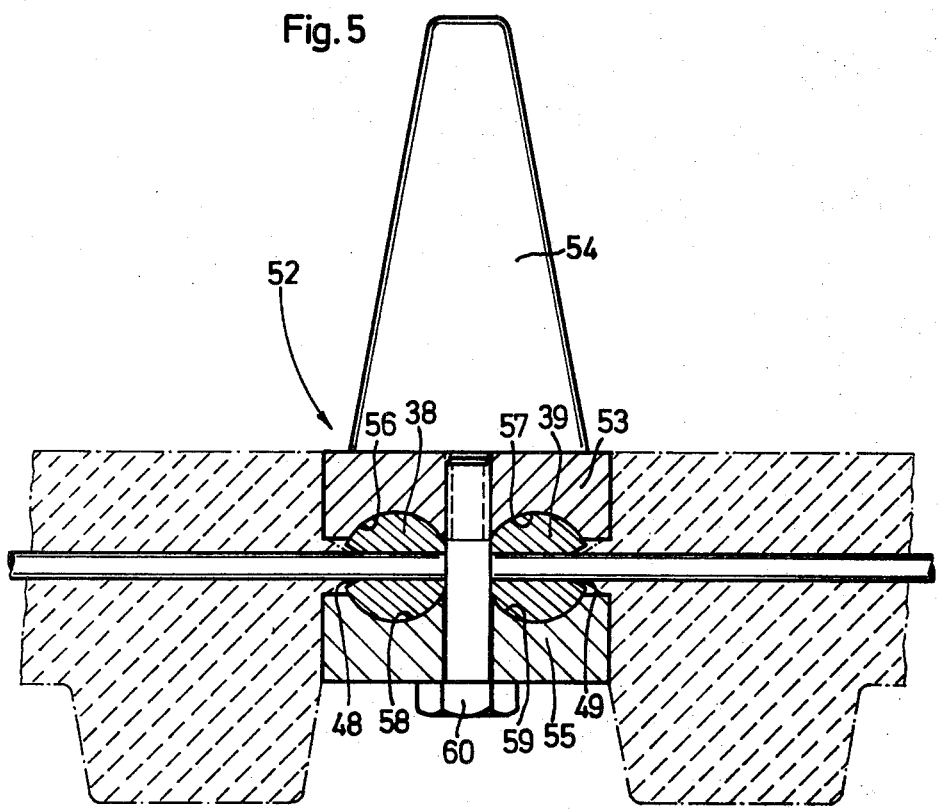

METHOD OF CONNECTING WIRE CABLES IN LOCKING BOLTS FOR A TRACK-LAYING CHAIN

The present invention relates to a method for connecting wire cables in locking bolts of a track-laying chain.

From U.S. Pat. No. 2,402,042 Houshalter issued June 11, 1946 on a Track for Vehicles it is known with a track-laying chain to provide the ends of steel cables with flange bushings which are either soldered to the cable ends or are keyed thereto. In this connection, thermal or mechanical overstresses may occur which during operation of the track-laying chain may bring about a premature break in the steel cables.

It is, therefore, an object of the present invention to provide a method for connecting wire cables in a safer way in a locking bolt of a track-laying chain so that the drawbacks inherent to a soldering or a key connection of the wire cables will be avoided.

This object and other objects and advantages of the invention will appear more clearly from the following specification, in connection with the accompanying drawings, in which:

FIG. 5 shows a connecting element for the locking bolts according to FIG. 1.

The method according to the invention for connecting wire cables in locking bolts of a track-laying chain is characterized primarily in that wire cables are placed into bores of a locking bolt, which locking bolt is placed into a guiding bearing which is open at its end faces, whereupon the bores are plastically deformed by a load acting at the end faces upon the locking bolt, which load is exerted by means of a press in the axial direction of the locking bolt. The advantage of a connection effected in this manner consists primarily in that between the deformed bore walls and the steel cables, uniform supporting areas are obtained over approximately the entire bore length. A breaking off or tearing out of the steel cables from the chain bolt will be avoided in this way.

For purposes of connecting wire cables in two locking bolts of a track-laying chain, it is provided according to a further development of the invention that a first and a second bolt is placed upon the wire cables while the second locking bolt is clamped fast upon the wire cables by a load at the end faces. The first locking bolt is placed upon the wire cables with a measurement 1 minus Δ1, and its bores preclamp the wire cables by a load exerted at the end faces of the bolt in such a way that the first locking bolt can still, against the friction in the preformed bores, be pushed by Δ1 to the measurement 1; whereupon this locking bolt after obtaining the measurement 1 is clamped fast on the wire cables by a load acting upon the end faces of the bolt. In this way, the advantage is obtained that all cables will have the same length, and in driving operation a uniform load will be assured on the wire cables. A non-uniform cable line and thereby a load on one cable in view of too short a length will in this way be avoided.

A device for carrying out the above mentioned method, comprises according to a modification, fixed abutments which are arranged on a machine for the second locking bolt, and furthermore comprises abutments which are provided for the first locking bolt and are displaceable by a lead screw. This modified machine furthermore comprises a press for exerting a load onto the end face sides of the locking bolts and also comprises guiding bearings which are open at the end faces for receiving locking bolts.

Figure 1:
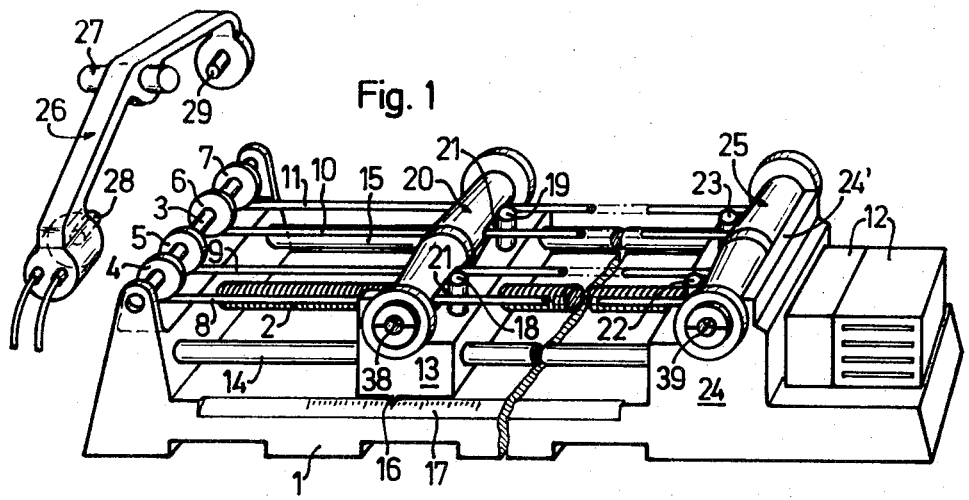
FIG. 1 illustrates a device for connecting wire cables in locking bolts.

Referring now to the drawings in detail, according to FIG. 1, cable drums 4 – 7 with steel cables 8 – 11 are freely rotatably mounted on a rod 3 which is supported by a displacement bench 1 which is provided with a lead screw 2. The lead screw is driven by a driving unit 12 and, depending on the direction of rotation thereof, moves a bearing block 13 either toward the left or the right on bearing rods 14, 15. Provided on the bearing block 13 is a marker 16 with vernier or nonium in order to be able on a ruler 17 which is connected to the machine to effect a measurement setting of the bearing block 13. The bearing block 13 is furthermore provided with two abutment pins 18, 19 engaged by a guiding bearing 20. Similarly, for a further guiding bearing 25 there are provided abutment pins 22, 23, which are arranged on a traverse 24 with abutment 24', said traverse being located at the side of the drive and being connected to the machine. The steel cables 18 – 11 are passed through respective recesses 21 of the guiding bearing 20 and the guiding bearing 25.

Above the displacement bench 1, a hydraulic press 26 is displaceably mounted on a bearing rod 27. The press 26 has a movable ram 28 and a rigid counter ram 29.

Figure 4:
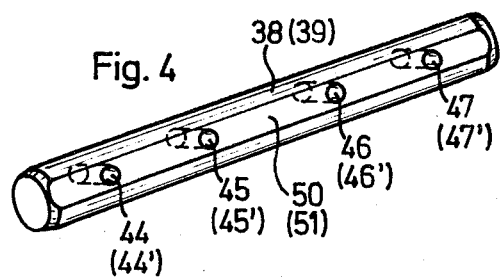
FIG. 4 illustrates a locking bolt.

The guiding bearing 20, which is identical to the guiding bearing 25 comprises two cups 30, 31 with recesses 34, 35. A shorter locking bolt 38, 39 (FIGS. 4, 5) is insertable into recesses 34, 35 which correspond to the diameter of the locking bolts 38, 39. The recesses 21 serve for passing therethrough the wire cables 8 – 11. The cups, or bowls, 30, 31 are held together by rings 40, 41; 42, 43. The guiding bearing 20, 25 will, when the bolts are under the load, at their end faces prevent a lateral escape of the chain bolt 38, 39 in axial direction thereof.

The locking bolts 38, 39 are each provided with four bores 44– 47 which extend all the way through and are located in a central plane pass through the axes of said bolts, the bores pertaining to one and the same locking bolt extending at a right angle to the longitudinal axis of the respective bolt. The bores 40 – 47 are on one side thereof provided with countersunk sections and at the respective opposite side lead into a flattened section 50, 51 respectively of the bolts 38 and 39.

A chain lock 52 shown in FIG. 5 of a non-illustrated track-laying chain comprises an upper plate 53 with a gripper tooth 54 forming one piece therewith and with a lower plate 55. The upper and lower plates 53, 55 are provided with recesses 56 – 59 into which locking bolts 38, 39 are inserted. The upper and lower plates 53, 55 are connected to each other by screws 6 (one only being shown).

For connecting the steel cables 8 – 11 in the locking bolts 38, 39, the latter are placed upon the wound-off steel cables 8 – 11. Assuming a steel cable diameter of 4 millimeters, the diameter of the bores 44– 47 will amount to 4.05 millimeters. The steel cables 8 – 11 and the locking bolt with its flattened area 51 are pressed against the abutment 24' in order to assure that the steel cables 8 – 11 extend completely through the bores 44 – 47. After the locking bolts 38, 39 have been mounted, the locking bolt 39 is inserted into the guiding bearing 25. The end sides of the locking bolt 39 are now subjected by the ram 28, 29 of press 26 to a pressure of 30 Mp. In this way, the bores 44' – 47' are deformed and the steel cables 8 – 11 are squeezed through the bore walls in such a way that the steel cables are uniformly clamped in and that uniform supporting or contacting surfaces are obtained.

As soon as the guiding bearing 25 has been removed, the locking bolt which engages the abutment pins 18, 19 is, by means of the bearing block 13, the lead spindle 2 and the driving unit 12 set for a locking bolt distance of from 1,300 millimeters (1) to 10 millimeters ($\Delta l$) = 1,290 millimeters. Thereupon, in order to be able to insert the locking bolt 38 into the guiding bearing 20, the bearing block 13 is moved back somewhat in the direction toward the abutment 24'. After the locking bolt 38 has been inserted, the locking bolt 38 is by the press 26 subjected to a load of 15 Mp whereby a preclamped, in other words, not yet finally clamped condition of the locking bolt 38 on the steel cables 8 – 11 will be obtained.

Figures 2, 3:
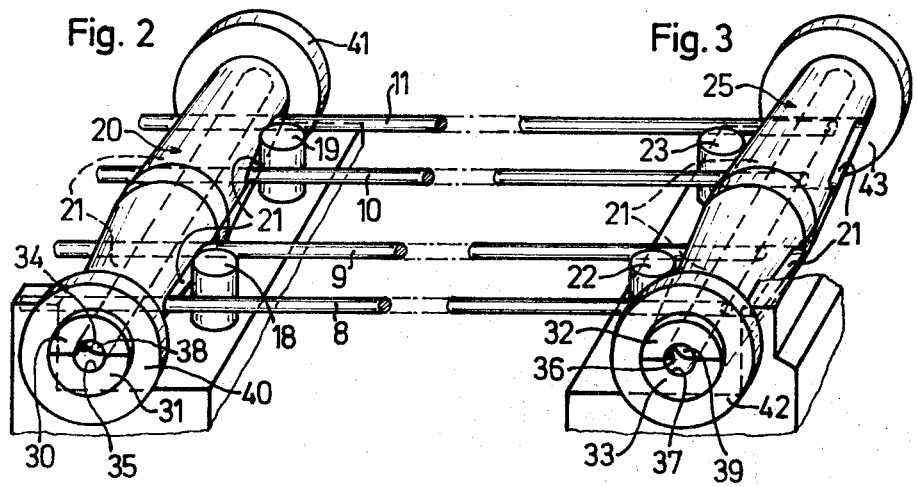
FIGS. 2 and 3 illustrate guiding bearing means for the device according to FIG. 1.

By the subsequent removal of the guiding bearing 20 and the displacement of the bearing block 13 to the measurement of 1,300 millimeters, which requires a force of 0.5 Mp it will be assured that all steel cables 8 – 11 will have the same length. During this displacement operation, the steel cables 8 – 11 slide through the prepressed bores 44 – 47. Thereupon, the locking bolts 38 are again inserted into the guiding bearing 20 and are subjected to a load of 30 Mp. By means of a non-illustrated cutting disc, the steel cables 8 – 11 are at the left-hand flattened locking bolt side (with regard to FIG. 2) cut off at the locking bolt 38.

With the described cycle, the insertion and removal of the locking bolts 38, 39 into and out of the guiding bearings 20, 25 be simplified by inserting the locking bolts 38, 39 in the guiding bearings 20, 25 after the locking bolts 38, 39 have been placed upon the steel cables 8 – 11 and by retaining said locking bolts in this inserted position until the locking bolt 38 has been clamped fast to the steel cables 8 – 11. In this connection, it must be borne in mind that the guiding bearings 20, 25 for the abutment pins 18, 19, 22, 23 have rectangular or concave abutment surfaces and that the rated distance (1,300 millimeters) is to be corrected in conformity with the distance from the radial distance to the fixing surface (distance time 2) as seen from the center of the locking bolt. Moreover, it has to be borne in mind that the steel cable ends which project beyond the flattened surface 51 of the locking bolt 39 have to be cut off.

A locking bolt connection effected in conformity with the above mentioned method has proved that during a pulling test, all of the cables 8 to 11 block. Not a single cable was torn out of the bore or tore off short of the bore.

It is, of course, to be understood that the present invention is, by no means, limited to the specific showing in the drawings, but also comprises any modifications within the scope of the appended claims. Thus, aside from the described connection of the locking bolts on the steel cables, a method may be used in connection with the present invention, which method is characterized in that after the placing of the locking bolts, all cables are simultaneously by a device subjected to a suitable pulling stress. The locking bolts are then, by means of the described press at a desired distance from each other, connected to wire cables. This brings about that following the relief of the steel cables from the pulling stresses, all of the cables will likewise have the same length, and therefore, the steel cables will during operation be subjected uniformly to the respective loads.

What is claimed is:

1. The method of connecting wire cables to locking bolts for a track-laying chain in which the cables are inserted into substantially diametral bores spaced axially along the bolts, radially confining the bolts, and applying axial force to the ends of the bolts to effect plastic deformation thereof in at least the axial regions of said bores thereby to fix the cables in said bores.

2. The method according to claim 1 which includes inserting said cables into axially spaced substantially diametral bores of at least first and second bolts, fixing the cables to the first bolt, disposing said second bolt along said cables a distance less than a predetermined distance from the first said bolt, applying an axial force to the ends of said second bolt to deform the second bolt into preclamping relation with said cables, forcing said bolts away from each other until said second bolt is said predetermined distance away from said first bolt, and applying an axial force to the ends of said second bolt thereby further to deform said second bolt in at least the regions of the bores therein to fixedly clamp said cables to said second bolt.

3. The method according to claim 1 in which one of said bolts is disposed at the free ends of said cables, and placing the one said bolt and the cable ends against an abutment prior to applying deforming force to the ends of the bolt.

4. The method according to claim 1 which includes placing a plurality of bolts on said cables, tensioning said cables to make the cables uniform, fixing the bolt at the free ends of the cables to the cables, and commencing with the bolt adjacent the bolt at the free end of the cables successively adjusting said bolts to a predetermined distance from the next preceding bolt and fixing the adjusted bolt to the cables.

* * * * *